Nov. 26, 1957  M. R. EUVERARD  2,814,122
DRY FILM THICKNESS GAGE
Filed Dec. 17, 1956  2 Sheets-Sheet 1
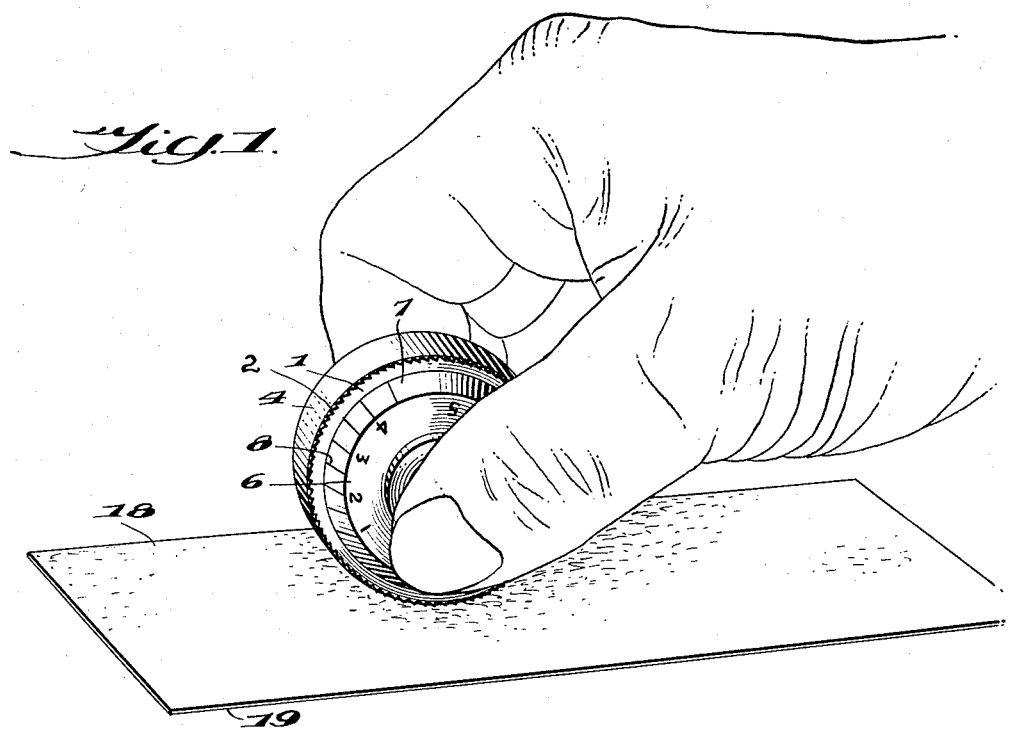
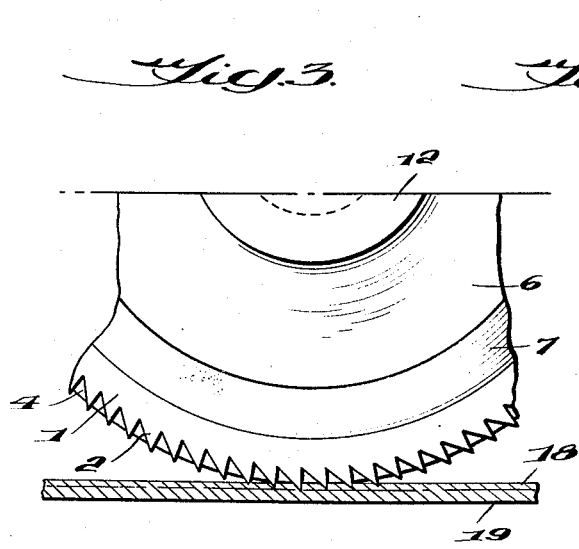
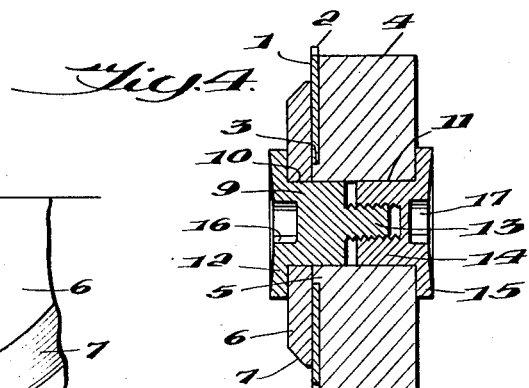
INVENTOR
Maynard R Euverard
BY Pierce, Scheffler & Parker
ATTORNEYS Nov. 26, 1957  M. R. EUVERARD  2,814,122
DRY FILM THICKNESS GAGE
Filed Dec. 17, 1956  2 Sheets-Sheet 2

INVENTOR
Maynard R. Euverard

ATTORNEYS

United States Patent Office 2,814,122
Patented Nov. 26, 1957

2,814,122
DRY FILM THICKNESS GAGE

Maynard R. Euverard, Short Hills, N. J.

Application December 17, 1956, Serial No. 628,657

5 Claims. (Cl. 33—169)

The present invention relates to an improved gage for determining the thickness of dried coatings applied to any base such as dried coatings of paints, lacquers, varnishes, plastics and the like. Coatings applied to any base material can be measured provided the surface is sufficiently rigid or can be supported so as not to be deformed by the gentle pressure required when taking a measurement. Measurements can be made on plane surfaces, on edges or on simple curved surfaces such as pipe, provided the gage is drawn in the direction of curvature. The gage has the additional advantage of being portable since it is of comparatively small size and weight and is adapted to be held by hand when taking a measurement. The gage can also be used in any position, it requires no calibration, it is easy to use and it is comparatively simple in construction requiring only a few parts and can be produced at relatively low cost. Moreover, the gage is reliable in operation and gives accurate results. The gage also has the advantage that the readings are not affected by non-uniform base characteristics and, since the top surface of the coating is the reference surface for the measurement, one thereby eliminates errors which otherwise accrue when using gages of the type which involve measurement also of the thickness of the base to which the coating is applied in order to measure the coating thickness. Furthermore, when multiple coats of different colored materials have been applied to a base surface, it is possible to determine the thickness of each coat.

The invention can be suitably called a "scratch thickness" gage since the gaging is accomplished by scratching the surface of the coating with a tooth having a predetermined depth of penetration below the surface of the coating. The gage is preferably provided with a plurality of teeth, each of which has a fixed but different depth of penetration and a suitable scale is provided to indicate the various depths of penetration. In one type of use, the coating thickness is determined by scratching the surface of the coating with that tooth which will just barely cut through the coating and expose the surface of the base to which the coating has been applied. The improved gage according to the invention also has a most usefule application as a "go-no go" type of gage in determining if a minimum specified thickness of coating has been applied to the base. For such application, a tooth representative of the minimum coating thickness is utilized and the gage can be considered to be non-destructive of all coatings which meet the prescribed minimum thickness since, in such case, the tooth will not cut entirely throught he coating to the base.

More particularly, a preferred embodiment of my improved thickness gage comprises a circular saw disc with pointed teeth, mounted eccentrically upon a circular side plate, the diameter of the side plate being slightly less than that of the saw disc, and the saw disc and supporting side plate being eccentrically assembled such that the points of successive teeth around the periphery of the saw disc project successively increasing distance beyond the periphery of the side plate, preferably starting with such distance equal to zero. The diameters of the saw disc and side plate are suitably chosen of the order of two inches or less so as to enable the gage to be conveniently held in the hand and drawn across the surface of the coating. In use, the gage is held in the hand and rests upon the surface of the coating with the particular tooth to be used pointing vertically downward. As the gage is drawn across the coating with the bottom of the side plate in contact with the coating, the tooth extending downward from the line of contact between the coating and the bottom of the side plate will penetrate just to and expose the surface of the base if the distance between the point of the tooth and the side plate is equal to the thickness of the coating.

The invention will be more clearly understood by the following detailed description of a preferred embodiment thereof and from the accompanying drawings. In these drawings:

Fig. 1 is a view in perspective of the gage as held in the hand;

Fig. 3 is a fragmentary side view similar to Fig. 2 showing the manner in which the selected tooth penetrates the coating to the surface of the base material;

Fig. 4 is a view in central longitudinal section of the gage drawn to substantially the same scale as depicted in Fig. 1 and showing the manner in which the saw disc is mounted upon the side plate.

Figure 2:
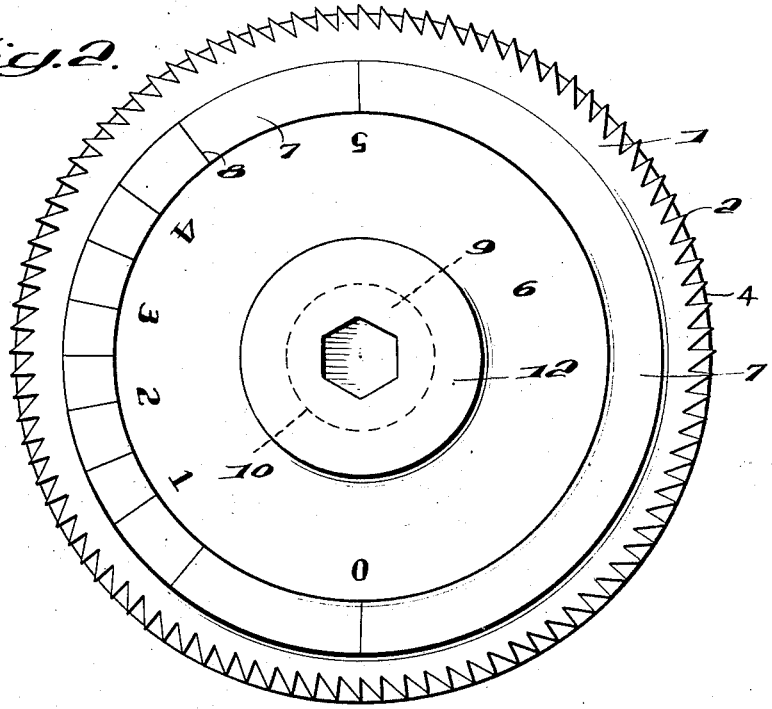
Fig. 2 is a view in side elevation of the gage drawn to an enlarged scale.
Figure 5:
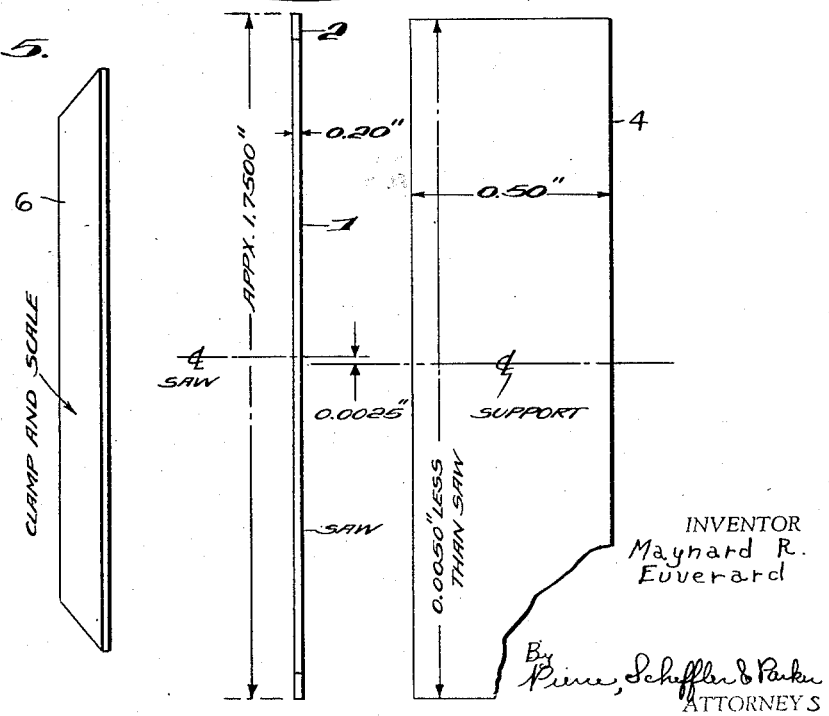
Fig. 5 is an exploded view showing the principal elements of the gage and the extent of the eccentricity in the mounting of the saw disc on its supporting side plate.

With reference now to the drawings, the toothed element of the gage is seen to be a circular saw disc 1 having an outer diameter of approximately 1.75 in. and a thickness of 0.020 in. The periphery of the disc is constituted by V-shaped teeth 2 of uniform size and shape. The saw disc is provided with a central circular opening 3 concentric with a circle touching the tips of the teeth 2. A metallic side plate for mounting the toothed disc is indicated at 4 and is seen to be circular and to have a diameter of about 0.0050 in. less than that of the disc 1. Plate 4 is preferably given a substantial thickness of the order of 0.50 in. so as to establish a rather heavy mass and broad base line of contact with the coating for better stability. The plate 4 is also provided at one side thereof with a circular boss 5 of a diameter substantially equal to the circular opening 3 in the disc 1 so as to establish a close, sliding fit, the disc 1 being mounted on the boss 5 as shown in Fig. 4. The center of the circular boss 5 is offset 0.0025 in. from the center of the side plate 4 as indicated in Fig. 5 thereby establishing a corresponding eccentricity between the circle defined by the tips of the teeth 2, which circle can be referred to as the tip circle, and the periphery of the side plate 4. The effect of this eccentricity is indicated in Fig. 2 where it will be seen that the tips of the saw teeth 2 at the bottom of the disc 1 are even, i. e. flush with the periphery of the support plate 4 and, as one proceeds from such point clockwise around the periphery of the disc, the tips of the saw teeth project beyond the periphery of plate 4 by a progressively increasing amount and reach a maximum at the top of the disc, i. e. 180° away from the starting point of "zero" projection at the bottom. Still continuing in a clockwise direction from the top, 180° point, the projections of the saw teeth progressively decrease until the bottom or "zero" projection point is reached. With such construction the range of the gage shown in the drawings is therefore from "zero" at the bottom of the disc 1 to maximum at the top of the disc and can be suitably graduated.

The particular gage depicted in the drawings has a range from zero to five mils and the scale graduations are established in accordance with the following table.

| Degrees From Zero Graduation | Theoretical Tooth Extension (in mils) | Graduation Marks |
|---|---|---|
| 0 | 0 | 0 |
| 38 | 0.53 | 0.5 |
| 54 | 1.03 | 1 |
| 66 | 1.49 | 1.5 |
| 78 | 1.99 | 2 |
| 90 | 2.50 | 2.5 |
| 102 | 3.03 | 3 |
| 114 | 3.52 | 3.5 |
| 126 | 3.97 | 4 |
| 142 | 4.47 | 4.5 |
| 180 | 5.00 | 5 |

As indicated in Fig. 4, the toothed disc 1 is retained on the boss 5 and plate 4 by means of a circular plate 6 which functions both as a pressure plate bearing against the adjacent face of disc 1 which in turn bears against the adjacent face of plate 4, and also as a scale plate. The periphery of the plate 6 is accordingly beveled at 7 and the radial graduation lines 8 are inscribed on the bevelled portion. For holding the plate 6 in place, it will be seen that a bolt and nut assembly is utilized. The bolt member 9, which passes through a central opening 10 in plate 6 into a central aperture 11 in the plate 4, has a flange 12 at one end bearing against the plate 6. The opposite end of bolt 9 is threaded at 13 and is threaded into a flanged nut 14 that is entered into the central opening 11 in plate 4 from the side opposite bolt 9. Nut 14 is provided with a flange 15 which bears against the adjacent face of plate 4 and the bolt and nut are tightened by means of Allen wrenches which are inserted into polygonally configured recesses 16, 17 in the bolt 9 and nut 14, respectively.

As indicated in the foregoing part of the specification the gage is used by selecting a tooth which is deemed to correspond most closely to the thickness of the coating to be measured. As shown by the scale, graduations are provided for each half mil between 0 and 5 mils and the ten different corresponding teeth will be satisfactory for most practical purposes. However, other graduations intermediate the half mil graduations can be provided if desired or interpolated measurements can be made between the half mil graduations. Having selected a tooth, the gage is placed on the surface of the coating generally as indicated in Fig. 1 with the selected tooth pointing directly downward. With the gage thus held, it is then drawn in a straight line cross the coating 18 whereupon the selected tooth will cut into the coating to a depth equal to the corresponding graduation reading. If the scratch line made by the tooth does not cut entirely through the coating 18 and expose the surface of the base 19, this, of course, indicates that the coating is thicker than that which is represented by that particular tooth. The gage is then rotated slightly so as to bring another tooth into the vertically downward position and which will effect a slightly deeper scratch into the coating. By this method, one will then ultimately locate the particular tooth which will just barely cut through and expose the surface of the base without also scratching the latter. The scale reading corresponding to such tooth will therefore indicate the thickness of the coating.

Another mode of use as explained in the foregoing part of the specification is as a "go-no go" type of gage. Assume, for example, that a coating is prescribed as having a minimum thickness of 3 mils. The tooth corresponding to the 3 mil graduation is then used to scratch the surface of the coating. If the thickness of the coating exceeds the 3 mil minimum, the scratch made by the 3 mil tooth will not expose the surface of the base. If the coating is less than 3 mils in thickness or just barely equals 3 mils, the base surface will be exposed thus indicating that such coating probably does not meet the prescribed minimum.

In conclusion it is desired to point out that while the construction illustrated in the drawings is a most practical one, it may be departed from in various aspects without, however, departing from the spirit and scope of the invention as defined in the appended claims. For example, two mounting side plates, one on each side of the toothed disc may be utilized. Also the gage may be made up in several sequential ranges.

Having now described my invention and stated the manner in which it may be practiced I claim as my invention:

1. In a gage for measuring the thickness of a dry coating upon a base material, the combination comprising a circular toothed disc and a circular side supporting plate for said disc, said disc being mounted eccentrically upon said supporting plate so as to cause different teeth on said disc to project different distances beyond the periphery of said supporting plate.

2. In a gage for measuring the thickness of a dry coating upon a base material the combination comprising a circular toothed disc, and a circular side supporting plate for said disc, the diameter of said supporting plate being less than that of said disc and said disc being mounted eccentrically upon said supporting plate so as to cause different teeth on said disc to project different distances beyond the periphery of said supporting plate.

3. In a gage for measuring the thickness of a dry coating upon a base material, the combination comprising a circular toothed disc, a side supporting plate for said disc, said disc being arranged eccentrically with respect to said supporting plate so as to cause different teeth on said disc to project different distances beyond the periphery of said supporting plate, and means including a combination pressure and graduation plate bearing against the face of said disc and securing said disc on said supporting plate and against one face thereof.

4. A gage as defined in claim 3 wherein said means securing said disc on said supporting plate comprises a flanged threaded bolt bearing against said pressure and graduation plate and extending through a central aperture thereof into a central aperture through said supporting plate and a flanged nut bearing against the opposite face of said supporting plate and extending into the aperture in said supporting plate and being threaded onto said bolt.

5. In a gage for measuring the thickness of a dry coating upon a base material, the combination comprising a circular toothed disc, a circular side supporting plate for said disc, the diameter of said supporting plate being less than that of said disc, a circular boss projecting from one side face of said supporting plate, the center of said boss being eccentric to the center of said supporting plate, said toothed disc including a concentric circular central aperture therein of substantially the same diameter as that of said boss whereby said disc is mounted upon said boss with one face thereof bearing against the adjacent face of said supporting plate, said disc being thereby mounted eccentrically with respect to said supporting plate so as to cause the teeth on said disc to project different distances beyond the periphery of said supporting plate and a circular pressure plate bearing against the opposite face of said toothed disc, said pressure plate also including graduations around the periphery thereof corresponding to the different distances which different teeth on said disc project beyond the periphery of said supporting plate.

References Cited in the file of this patent

UNITED STATES PATENTS

| | | |
|---|---|---|
| 1,909,652 | Bower | May 16, 1933 |
| 1,927,821 | Abbott | Sept. 26, 1933 |
| 2,546,990 | Euverard et al. | Apr. 3, 1951 |
| 2,675,623 | Lewis et al. | Apr. 20, 1954 |

FOREIGN PATENTS

| | | |
|---|---|---|
| 685,238 | Great Britain | Dec. 31, 1952 |
| 930,898 | Germany | July 28, 1955 |